United States Patent
Angyal et al.

(10) Patent No.: US 12,240,418 B2
(45) Date of Patent: Mar. 4, 2025

(54) WIPER BLADE, IN PARTICULAR FOR A MOTOR VEHICLE

(71) Applicant: Robert Bosch GmbH, Stuttgart (DE)

(72) Inventors: Adam Angyal, Budapest (HU); Christian Wilms, Beringen-Koersel (BE); Marcel Ekermans, Sittard (NL); Marcello Bubba, Linden (BE); Nicolaas Gotzen, Kortenberg (BE); Peter Kuypers, Tongeren (BE); Thomas Belmans, Beringen (BE); Wim Buseyne, Hasselt (BE)

(73) Assignee: Robert Bosch GmbH, Stuttgart (DE)

( * ) Notice: Subject to any disclaimer, the term of this patent is extended or adjusted under 35 U.S.C. 154(b) by 6 days.

(21) Appl. No.: 18/078,139

(22) Filed: Dec. 9, 2022

(65) Prior Publication Data

US 2023/0182687 A1     Jun. 15, 2023

(30) Foreign Application Priority Data

Dec. 10, 2021   (DE) .......................... 102021214108.0

(51) Int. Cl.
   *B60S 1/38*     (2006.01)
(52) U.S. Cl.
   CPC .......... B60S 1/38 (2013.01); *B60S 2001/3836* (2013.01); *B60S 1/3879* (2013.01)
(58) Field of Classification Search
   CPC ............... B60S 1/38; B60S 2001/3836; 2001/3838; B60S 1/524; B60S 1/3837; B60S 2001/3839; B60S 2001/3837; B60S 2001/3834
   USPC ......... 15/250.48, 250.04, 250.361; D12/219, D12/220
   See application file for complete search history.

(56) References Cited

U.S. PATENT DOCUMENTS

| | | | |
|---|---|---|---|
| 2,782,444 A * | 2/1957 | Krohm | B60S 1/3801 15/250.48 |
| 3,566,432 A | 3/1971 | Quinlan et al. | |
| 3,881,212 A * | 5/1975 | Regler | B60S 1/38 15/250.04 |

(Continued)

FOREIGN PATENT DOCUMENTS

| | | | |
|---|---|---|---|
| DE | 19524108 | * | 1/1996 |
| DE | 19745006 | * | 4/1999 |

(Continued)

OTHER PUBLICATIONS

Machine translation of description portion of German publication 19524108, published Jan. 1996. (Year: 1996).*

(Continued)

*Primary Examiner* — Gary K. Graham
(74) *Attorney, Agent, or Firm* — Michael Best & Friedrich LLP

(57) ABSTRACT

A wiper blade (10), in particular for a motor vehicle, includes a wiper strip (16) that is held between a first spring rail portion (34) and a second spring rail portion (36) by a fastening portion (24), and includes a substantially triangular lip portion (18). A cavity portion (22) is provided between the fastening portion (24) and the lip portion (18), at the lower wall (44) of which cavity portion, on the side facing the lip portion (18), at least one guide shoulder (56) for guiding the lip portion (18) is arranged.

17 Claims, 3 Drawing Sheets

(56) References Cited

U.S. PATENT DOCUMENTS

| | | | | |
|---|---|---|---|---|
| 5,251,357 | A | * | 10/1993 | Jang .................. B60S 1/38 |
| | | | | 15/250.4 |
| 5,383,247 | A | * | 1/1995 | Nickel ................ B60S 1/546 |
| | | | | 15/250.04 |
| 5,784,751 | A | * | 7/1998 | Tippets ............... B60S 1/524 |
| | | | | 15/250.04 |
| 6,115,876 | A | | 9/2000 | Zimmer |
| 8,826,485 | B2 | * | 9/2014 | Boland ............... B60S 1/3877 |
| | | | | 15/250.43 |
| 9,463,779 | B2 | * | 10/2016 | Gross .................. B60S 1/524 |
| 2020/0324736 | A1 | * | 10/2020 | Steiner ............... B60S 1/3808 |
| 2020/0391700 | A1 | * | 12/2020 | Angyal ............... B60S 1/38 |
| 2023/0182688 | A1 | | 6/2023 | Angyal et al. |

FOREIGN PATENT DOCUMENTS

| | | | |
|---|---|---|---|
| DE | 19745686 | A1 | 4/1999 |
| DE | 102005054142 | * | 5/2007 |
| DE | 102019214976 | A1 | 4/2021 |
| EP | 0506541 | * | 9/1992 |
| FR | 2869278 | A1 | 10/2005 |
| GB | 707559 | A | 4/1954 |
| GB | 2254543 | * | 10/1992 |
| WO | 2009/007647 | * | 1/2009 |
| WO | 2014177219 | A1 | 11/2014 |
| WO | 2019105648 | A1 | 6/2019 |

OTHER PUBLICATIONS

Machine translation of description portion of German publication 102019214976, published Apr. 2021. (Year: 2021).*

United States Patent Office Non-final Action for U.S. Appl. No. 18/078,141 dated Apr. 21, 2023 (10 pages).

* cited by examiner

WIPER BLADE, IN PARTICULAR FOR A MOTOR VEHICLE

BACKGROUND OF THE INVENTION

The invention relates to a wiper blade, in particular for a motor vehicle.

Some wiper blades are known having a wiper strip that is held between a first spring rail portion and a second spring rail portion by a fastening portion, which wiper blades have a substantially triangular lip portion that has a plurality of parallel incisions.

For example, DE 10 2019 214 976 A1 shows such a wiper blade.

SUMMARY OF THE INVENTION

The wiper blade according to the invention has the advantage that a cavity portion is provided between the fastening portion and the lip portion, on the lower wall of which cavity portion is arranged, on the side facing the lip portion, at least one guide shoulder for guiding the lip portion. This achieves a better wiping result without increasing the costs for the wiper blade.

It is advantageous if the guide shoulder is designed as a groove or indentation, since the wiper lip is thereby optimally supported.

An advantageously simple embodiment is provided in that the lip portion is approximately triangular in cross-section and has an edge on each side, the edge of the lip portion that is in each case at the rear in the direction of movement of the wiper strip during operation engaging in the guide shoulder.

Advantageously, a simple and cost-effective embodiment results in that the cavity portion is substantially rectangular in cross-section.

Furthermore, it is to be regarded as advantageous if the fastening portion is substantially T-shaped, since the wiper strip is thereby securely held.

In a further advantageous development of the invention, the first and/or the second spring rail portion is arranged between the cavity portion and an upper beam of the fastening portion, since in this way the wiper strip is securely held.

It is furthermore advantageous if the lip portion is mirror-symmetrical in cross-section and has exactly two incisions on each side. Extensive trials have shown that a particularly good wiping result is then achieved.

It is particularly advantageous here if in particular two, preferably exactly two, further tilting connecting pieces are formed by the incisions, since this further improves the wiping image.

In this case, it is particularly advantageous if the first tilting connecting piece has a first width and one of the further tilting connecting pieces has a second width and the second width is equal to or smaller than the first width.

In a particularly favorable and therefore advantageous embodiment, the incisions have a cut width of less than 1 mm, in particular less than 0.8 mm, preferably less than 0.5 mm.

BRIEF DESCRIPTION OF THE DRAWINGS

An exemplary embodiment of the invention is illustrated in the drawings and is explained in more detail in the following description. In the drawings.

DETAILED DESCRIPTION

Figure 1:
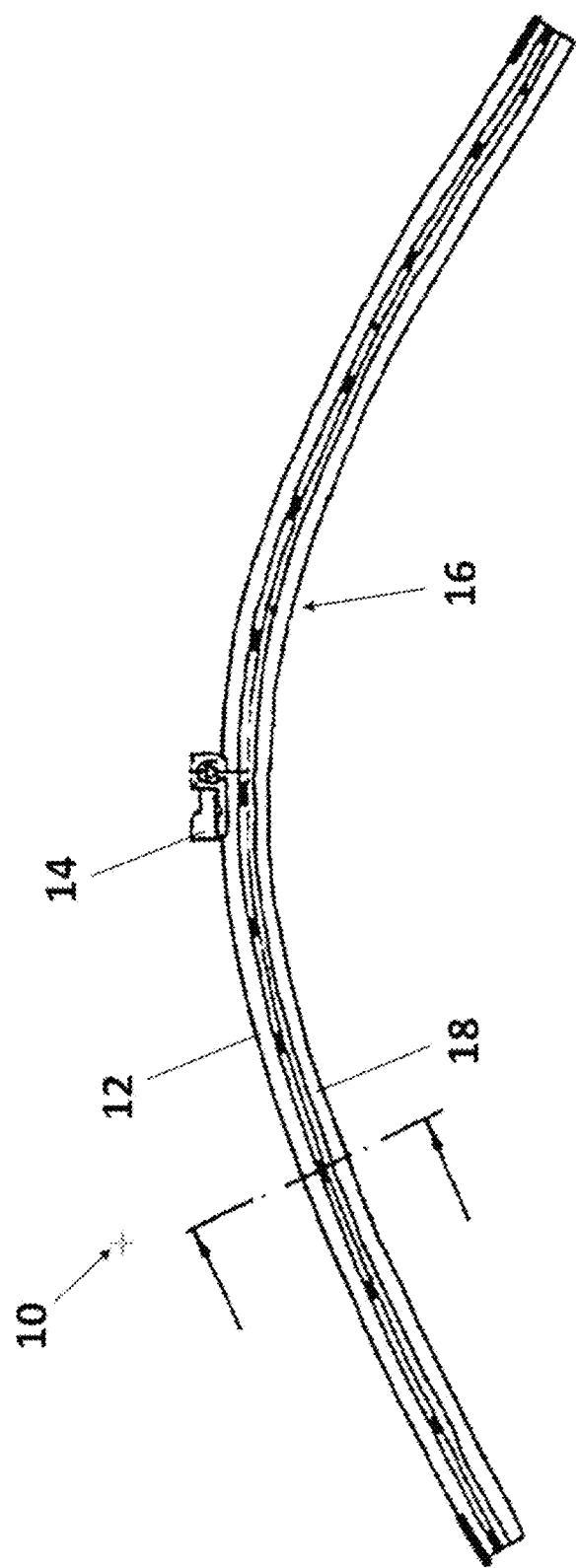
FIG. 1 shows a wiper blade according to the invention in a schematic side view.

FIG. 1 is a schematic side view of a wiper blade 10 according to the invention. This blade comprises a spring rail 12 on which a fastening means 14 for fastening to a wiper arm, which is not shown here for reasons of clarity, is fastened. A wiper strip 16 is arranged on the spring rail 12 on the side facing away from the fastening element 14 and carries a lip portion 18 on its side facing away from the spring rail 12, which lip portion is capable of removing moisture from a screen 20 (FIG. 2) during operation. The wiper blade 10 has a longitudinal extension, the fastening element 14 being arranged approximately in the center of the longitudinal extension. End caps, not specifically designated, are arranged at the ends of the longitudinal extension.

Figure 2:
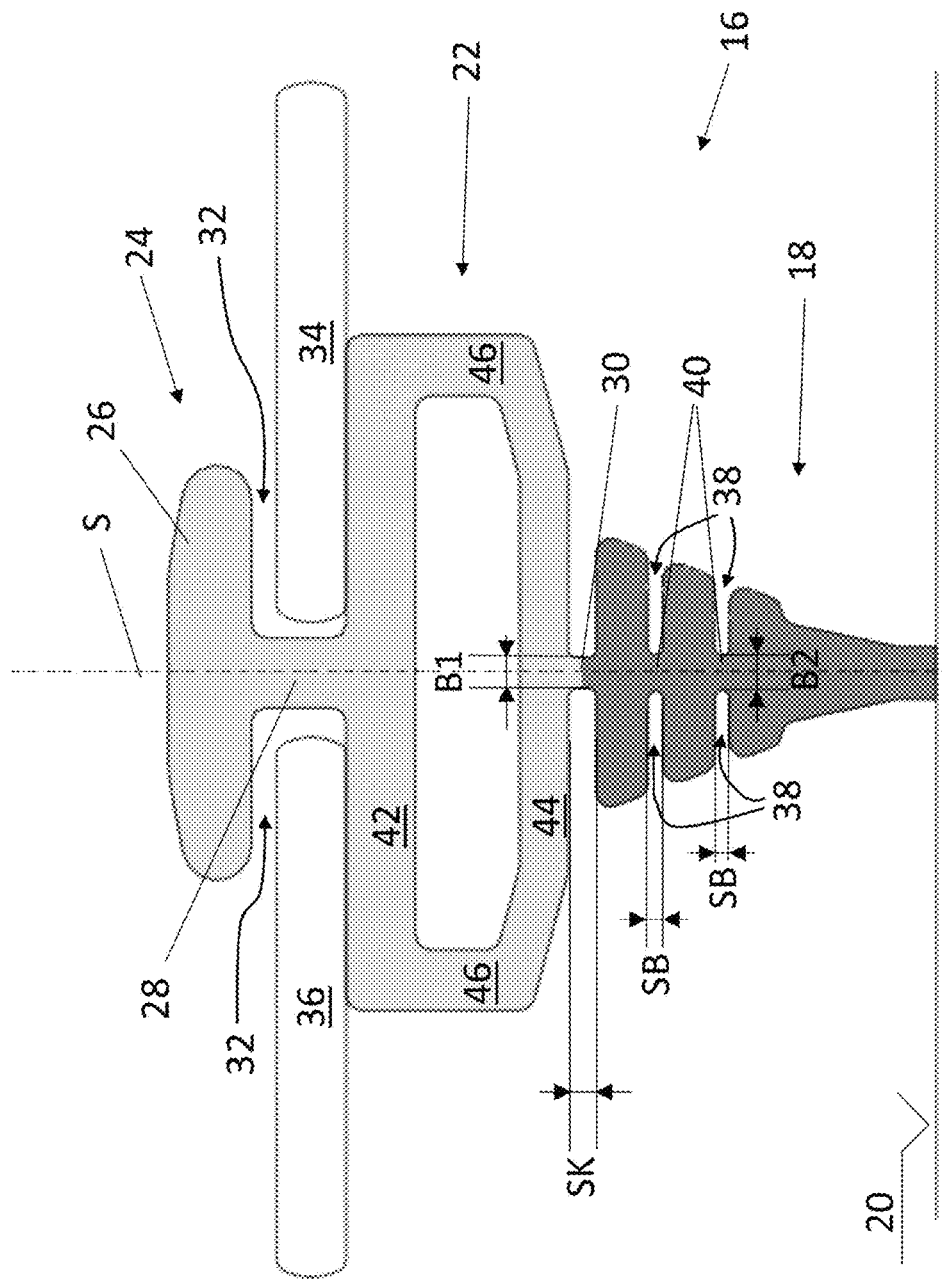
FIG. 2 shows a cross-section through a wiper strip of a wiper blade.

FIG. 2 shows a cross-section through the wiper strip 16 of a wiper blade 10 according to the invention. The wiper strip 16 is designed so as to be mirror-symmetrical about an imaginary axis of symmetry S. In the mounted position, the wiper strip 16, more precisely the lip portion 18 of the wiper strip 16, rests on the screen 20 in order to wipe moisture from said screen.

The wiper strip 16 is constructed substantially in three parts. A cavity portion 22 is provided above the lip portion 18. A fastening portion 24 adjoins the cavity portion 22. The fastening portion 24 is T-shaped and therefore comprises a horizontal upper beam 26 and a vertical connecting piece 28. The lip portion 18 and the cavity portion 22 are connected via a first tilting connecting piece 30. This first tilting connecting piece 30 has a first width B1. The first tilting connecting piece height SK corresponds to the height of the first tilting connecting piece 30 and is approximately 0.6 mm.

A retaining groove 32 is thereby formed at the left and right in cross-section in each case by the connecting piece 28 which adjoins the cavity portion 22 and the upper beam 26. A first spring rail portion 34 is seated in the one retaining groove 32 and a second spring rail portion 36 is seated in the other retaining groove 32. The length of the connecting piece 28 corresponds approximately to the thickness of the first spring rail portion 34 or of the second spring rail portion 36, so that the wiper strip 16 is securely held in the vertical direction between the first spring rail portion 34 and the second spring rail portion 36.

The lip portion 18 has two incisions 38 at the left and right in cross-section in each case. Each incision 38 extends horizontally and is spaced apart from the axis of symmetry S. This results, due to the depth of incisions 38, in further tilting connecting pieces 40, which have a second width B2.

The incisions 38 have a cut width SB of approximately 0.4 mm. This results in a second tilting connecting piece height that corresponds to the cut width SB.

The cavity portion 22 is substantially rectangular in shape and can be hollow in its interior. However, the cavity portion 22 does not have to be hollow. Depending on the choice of material, the cavity portion 22 can be made of solid material. The cavity portion 22 comprises an upper wall 42 on which the connecting piece 28 is arranged approximately centrally. Furthermore, the cavity portion 22 comprises a lower wall 44 on which the first tilting connecting piece 30 is arranged perpendicularly, approximately centrally. If the cavity portion 22 is hollow inside, the lower wall 44 is somewhat thinner than the upper wall 42, so that it has a higher elasticity. The lower wall 44 is wider in cross-section than the total width of the lip portion 18. In particular, the width of the lower wall 44 is selected in such a way that when the lip portion 18 is tilted about the first tilting connecting piece 30, the lip portion 18 is able to be supported on the lower wall 44. The side walls 46 arranged between the upper wall 42 and the lower wall 44 are angled, so that the lower wall 44 is somewhat narrower in cross-section than the upper wall 42. The total width of the cavity portion 22 is, in cross-section, approximately two to four times, preferably two to three times, the largest width of the lip portion 18.

The first width B1 of the first tilting connecting piece 30 is somewhat larger than the second width B2 of the further tilting connecting pieces 40. In a variation of the invention, the further tilting connecting pieces 40 can also have a different width; in particular, the width of the further tilting connecting pieces 40 can successively decrease starting from the first tilting connecting piece 30. In a further variation of the invention, the cut width SB of the incisions 38 can also be different, in particular increasing successively starting from the first tilting connecting piece 30.

The wiper strip 16 is extruded from EPDM. A co-extrusion process is used here, but alternatively only a single plastics material can also be used. The region of the lip portion 18 is made of somewhat softer EPDM than the remaining region of the wiper strip 16. Thus, the cavity portion 22 has a greater hardness than lip portion 16. Furthermore, the cavity portion 22 has a higher damping than the lip portion 16. In a further variation, the fastening portion 24 can also be made of a stronger plastics material, so that the wiper strip is extruded from three different plastics materials.

The cavity of the cavity portion 22 can be open on both sides with respect to the longitudinal extension, so that air is located therein. In a variation, the ends of the longitudinal extension of the cavity portion 22 can also be closed and the cavity can be filled in particular with gas or compressed air.

Figure 3:
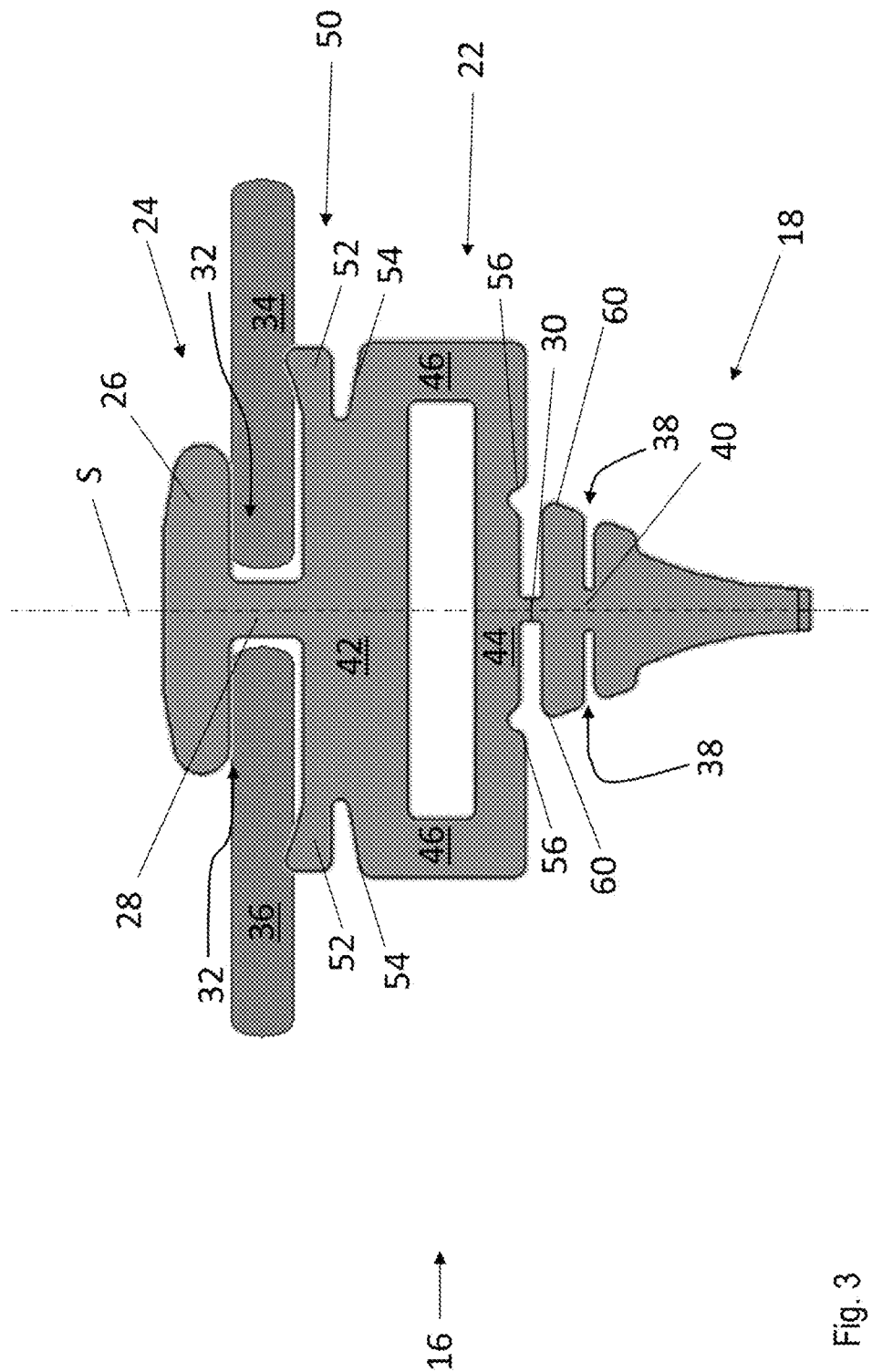
FIG. 3 shows a cross-section through a wiper strip of a wiper blade according to the invention.

FIG. 3 shows a cross-section through a wiper strip 16 of a wiper blade 10 according to the invention, in a variation of the invention. To avoid repetition, only the differences from FIG. 2 are explained. To this extent, the statements regarding FIG. 2 also apply here.

Between the cavity portion 22 and the fastening portion 24, a damping portion 50 is provided in which damping means 52 are arranged. The damping means 52 are designed as wings or tabs which extend from the upper wall 42 of the cavity portion 22 with their free end into the retaining grooves 32. The damping means 52, thus the wings or tabs, are integral with the cavity portion 22, but the damping means can also be formed separately and fastened to the cavity portion 22, for example by gluing or integral bonding. In a variation of the invention, the damping means 52 can also be formed as an in particular planar layer that is fastened to the cavity portion 22. For example, a layer of felt or a polymer foam is possible here.

The distance between the upper wall 42 of the cavity portion 22 and the upper beam 26 is therefore somewhat greater than in the previous exemplary embodiment, and significantly greater than the thickness of the first spring rail portion 34 or the second spring rail portion 36. As shown here, the upper wall 42 of the cavity portion 22 can also have shoulders 54, so that the wings extend approximately horizontally as damping means 52 and are thickened in the direction of their free end, i.e. have a greater width or height in cross-section. The perpendicular distance between the uppermost end of the damping means 52 and the lower plane of the beam 26, i.e. the distance in which the first spring rail portion 34 or the second spring rail portion 36 is inserted, is somewhat smaller than the thickness of the spring rail portions 34, 36, so that said spring rail portions are mounted without play, but resiliently, in the holding grooves 32.

The lip portion 18 has a single incision 38 only at the left and right, as seen in cross section. As a result, only a single further tilting connecting piece 40 is formed in addition to the first tilting connecting piece 30.

Furthermore, in the lower wall 44 of the cavity portion 22, a guide shoulder 56 is arranged at the left and right in each case, viewed in cross-section. This guide shoulder is designed as a groove or indentation which is located on the side of the lower wall 44 facing the lip portion 18, so that the guide shoulder 56 is formed due to the indentation. The guide shoulder 56 is arranged at the location at which the lip portion 18 touches the lower wall 44 of the cavity portion 22 when tilted about the first tilting connecting piece 30. If the lip portion 18 is tilted during a wiping operation, the tilting connecting piece 30 tilts accordingly. Since the lip portion 18 that is approximately triangular in cross-section has an edge 60 on each side, the edge 60 of the lip portion 18 that is in each case at the rear in the direction of movement of the wiper strip 16 engages in the guide shoulder 56 and supports the lip portion 18 as a result, so that the lip portion 18, or more precisely, the rear edge 60 of the lip portion 18, is secured against sliding off on the cavity portion 22.

The entire wiper strip 16 is produced integrally from plastics material, in particular an elastomer, for example EPDM. The wiper strip 16 can be produced for example by extrusion or injection molding. In particular, a plurality of different plastics materials can be used here, for example by a multicomponent extrusion or injection molding process.

What is claimed is:

1. A wiper blade (10) that extends along a longitudinal axis, the wiper blade (10) comprising a wiper strip (16) that is held by a fastening portion (24), the wiper strip (16) having a substantially triangular lip portion (18), wherein a cavity portion (22) is provided between the fastening portion (24) and the lip portion (18) along a perpendicular axis (S) that is perpendicular to the longitudinal axis, wherein the cavity portion (22) includes a lower wall (44) that faces the lip portion (18) and extends perpendicular to the perpendicular axis (S), wherein the lower wall (44) includes a first guide shoulder (56) for guiding the lip portion (18) and a second guide shoulder (56) for guiding the lip portion (18), wherein the first guide shoulder (56) and the second guide shoulder (56) are each grooves or indentations located along a lower surface of the lower wall (44), wherein the cavity portion (22) includes an upper wall (42) located opposite the lower wall (44) along the perpendicular axis (S), wherein the cavity portion (22) further includes side walls (46) that each extend between, and perpendicular to, the upper wall (42) and the lower wall (44), wherein the upper wall (42), the lower wall (44), and the side walls (46) define a hollow cavity, wherein the hollow cavity is fully enclosed by the upper wall (42), the lower wall (44), and the side walls (46) along an entire longitudinal length of the wiper blade (10) when viewed along the longitudinal axis, wherein a damping portion (50) is provided between the cavity portion (22) and the fastening portion (24), wherein the damping portion (50) includes wings or tabs (52) which extend from the upper wall (42) of the cavity portion-(22) and into retaining grooves (32) that are configured to receive spring rail portions (34, 36), wherein the lip portion (18) includes a first edge (60), wherein the first edge (60) of the lip portion (18) is sized and shaped and positioned relative to the first guide shoulder (56) so as to engage into the first guide shoulder (56) and contact the lower wall (44) when the lip portion (18) is tilted relative to the cavity portion (22) in a first direction, wherein the lip portion (18) includes a second edge (60), wherein the second edge (60) of the lip portion (18) is sized and shaped and positioned relative to the second guide shoulder (56) so as to engage into the second guide shoulder (56) and contact the lower wall (44) when the lip portion (18) is tilted relative to the cavity portion (22) in a second direction that is opposite the first direction, wherein the hollow cavity has a first width that extends between the side walls (46), and wherein the first guide shoulder (56) and the second guide shoulder (56) are separated by a second width that is less than the first width.

2. The wiper blade (10) according to claim 1, wherein the cavity portion (22) is substantially rectangular in cross-section.

3. The wiper blade (10) according to claim 1, wherein the fastening portion (24) is substantially T-shaped.

4. The wiper blade (10) according to claim 1, wherein a first and/or second spring rail portion (34, 36) is/are arranged between the cavity portion (22) and an upper beam (26) of the fastening portion (24).

5. The wiper blade (10) according to claim 1, wherein the lip portion (18) is mirror-symmetrical in cross-section and has an incision (38) on each side.

6. The wiper blade (10) according to claim 5, further comprising a tilting connecting piece (30) between the cavity portion (22) and the lip portion (18), wherein at least one further tilting connecting piece (40) is formed by the incisions (38).

7. The wiper blade (10) according to claim 5, wherein the incisions (38) have a cut width (SB) of less than 1 millimeter.

8. The wiper blade (10) according to claim 5, wherein the incisions (38) have a cut width (SB) of less than 0.5 millimeter.

9. The wiper blade (10) according to claim 1, wherein the wiper blade (10) is a motor vehicle wiper blade (10).

10. The wiper blade (10) according to claim 1, wherein the upper wall (42) includes shoulders (54) that are spaced below at least a portion of the wings or tabs (52).

11. The wiper blade (10) according to claim 1, wherein each of the wings or tabs (52) is thicker at a free end than at an end coupled directly to the upper wall (42).

12. The wiper blade (10) according to claim 11, wherein a perpendicular distance between an uppermost end of one of the wings or tabs (52) and an upper beam (26) of the fastening portion (24) is configured to be smaller than a thickness of one of the spring rail portions (34, 36), such that the spring rail is configured to be resiliently held in the retaining groove (32).

13. The wiper blade (10) according to claim 1, wherein the fastening portion (24) includes an upper beam (26) having a width along a direction perpendicular to the perpendicular axis (S), wherein the wings or tabs (52) include a first wing or tab (52) and a second wing or tab (52), wherein a distance between the first wing or tab (52) and the second wing or tab (52) is greater than the width of the upper beam (26).

14. The wiper blade (10) according to claim 1, further comprising a tilting connecting piece (30) between the cavity portion (22) and the lip portion (18), and wherein the lip portion (18) is positioned entirely below the cavity portion (22) along the perpendicular axis (S).

15. The wiper blade (10) according to claim 1, wherein the cavity portion defines a rectangular cross-sectional opening.

16. The wiper blade (10) according to claim 1, wherein the perpendicular axis (S) is an axis of symmetry.

17. The wiper blade (10) according to claim 1, wherein the cavity is rectangular as viewed along the longitudinal axis.

* * * * *